(12) United States Patent
Khal et al.

(10) Patent No.: US 10,632,962 B2
(45) Date of Patent: Apr. 28, 2020

(54) SEATBELT RETRACTOR (71) Applicant: Ford Global Technologies, LLC, Dearborn, MI (US)

(72) Inventors: Abdelrahim Khal, Dearborn, MI (US); Marwan Ahmad Elbkaily, Canton, MI (US); Eric Axel Smitterberg, Berkley, MI (US); Kaiming Sun, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 15/827,917

(22) Filed: Nov. 30, 2017

(65) Prior Publication Data
US 2019/0161054 A1 May 30, 2019

(51) Int. Cl.
*B60R 22/20* (2006.01)
*B60R 22/24* (2006.01)
*B60R 22/26* (2006.01)
*B60R 22/18* (2006.01)
*B60R 22/34* (2006.01)

(52) U.S. Cl.
CPC .............. *B60R 22/20* (2013.01); *B60R 22/24* (2013.01); *B60R 2022/1818* (2013.01); *B60R 2022/266* (2013.01); *B60R 2022/3402* (2013.01)

(58) Field of Classification Search
CPC . B60R 22/20; B60R 22/24; B60R 2022/3402; B60R 2022/1818; B60R 2022/266
See application file for complete search history.

(56) References Cited

U.S. PATENT DOCUMENTS

| | | | | |
|---|---|---|---|---|
| 4,031,344 A | * | 6/1977 | Pilarski | B60R 22/48 200/61.58 B |
| 4,167,277 A | * | 9/1979 | Rumpf | B60R 22/34 280/807 |
| 4,488,609 A | * | 12/1984 | Sarin | E21B 10/38 175/418 |
| 4,568,107 A | * | 2/1986 | Biviano | B60R 22/022 280/801.1 |
| 4,789,186 A | | 12/1988 | Andersson | |
| 5,037,135 A | | 8/1991 | Kotikovsky et al. | |
| 5,603,527 A | | 2/1997 | Bee | |
| 5,611,604 A | * | 3/1997 | Thomas | B60R 22/26 297/478 |
| 6,033,030 A | | 3/2000 | Valasin | |
| 7,802,819 B2 | | 9/2010 | Ng | |
| 7,806,439 B2 | | 10/2010 | Clute | |
| 8,408,599 B2 | | 4/2013 | Strnad et al. | |
| 2004/0026981 A1 | * | 2/2004 | Maloney | B60R 22/1855 297/474 |

(Continued)

FOREIGN PATENT DOCUMENTS

| | | | | |
|---|---|---|---|---|
| CN | 102229329 B | | 6/2013 | |
| GB | 2433476 A | * | 6/2007 | ............ B60R 22/24 |
| KR | 20060017013 A | | 2/2006 | |

*Primary Examiner* — Darlene P Condra
(74) *Attorney, Agent, or Firm* — Frank A. MacKenzie; Bejin Bieneman PLC (57) ABSTRACT

An assembly includes a base. The assembly includes a plate pivotally supported by the base. The assembly includes a seatbelt retractor supported by the plate. The assembly includes a webbing payable from the seatbelt retractor.

20 Claims, 8 Drawing Sheets

(56) References Cited

U.S. PATENT DOCUMENTS

2014/0312677 A1\* 10/2014 Bostrom ................ B60N 2/688
                                                             297/464
2016/0121845 A1   5/2016 Lee et al.
2016/0362083 A1\* 12/2016 Taylor .................... B60R 22/12

\* cited by examiner

SEATBELT RETRACTOR

BACKGROUND

The seatbelt portion of a vehicle restraint system secures an occupant of a vehicle against harmful movement that may result from a vehicle collision. The seatbelt functions to reduce the likelihood of injury by reducing the force of occupant impacts with vehicle interior structures. In this role, the seatbelt applies loads across the chest or lap of the occupant. Controlling or reducing these loads may reduce the risk of occupant injury during a collision.

DETAILED DESCRIPTION

An assembly includes a base. The assembly includes a plate pivotally supported by the base. The assembly includes a seatbelt retractor supported by the plate. The assembly includes a webbing payable from the seatbelt retractor.

The assembly may include a seat, the base may be secured to the seat.

The assembly may include a vehicle roof, the base may be supported by the vehicle roof.

The assembly may include a vehicle occupant compartment having a longitudinal axis bisecting the vehicle occupant compartment, and a seat on the longitudinal axis, the seat may be underneath the base.

The assembly may include a vehicle roof and an axis extending transverse to the roof, the plate may pivot about the axis.

The axis may be generally vertical.

The plate may pivot in a cross-vehicle direction.

The assembly may include a vehicle occupant compartment having a lateral axis, a first seat, a second seat spaced from the first seat along the lateral axis, and a third seat between the first seat and the second seat, the third seat may be underneath the base.

The seatbelt retractor may be supported on top of the plate.

The plate may extend horizontally.

The plate may include a slot, the webbing may be disposed within the slot.

The assembly may include a liner supported by the plate at the slot.

The assembly may include a hinge pin connecting the base to the plate.

The base may include a second plate and a third plate spaced from the second plate, the plate may be disposed between the second plate and the third plate.

The assembly may include a hinge pin engaged with the plate, the second plate and the third plate.

The base may include a main portion, the second plate and the third plate may be transverse to the main portion.

The base may include a distal end having an arcuate profile.

The seatbelt retractor may be spaced from the base.

The base may be transverse to the plate.

With reference to the Figures, wherein like numerals indicate like parts throughout the several views, a seatbelt assembly 20 for a vehicle 22 includes a base 24. The seatbelt assembly 20 includes a first plate 26 pivotally supported by the base 24. The seatbelt assembly 20 includes a seatbelt retractor 28 supported by the first plate 26. The seatbelt assembly 20 includes a webbing 30 payable from the seatbelt retractor 28.

The pivoting of the first plate 26 relative to the base 24 permits the seatbelt retractor 28 to pivot when the webbing 30 is urged toward a side of the vehicle 22, e.g., during a vehicle side impact or other vehicle impact that causes movement of an occupant relative to the vehicle 22. The pivoting reduces a likelihood of wear on the webbing 30, and/or excess loading on the seatbelt assembly 20 and/or webbing 20.

The vehicle 22 may be any passenger or commercial automobile such as a car, a truck, a sport utility vehicle, a crossover vehicle, a van, a minivan, a taxi, a bus, etc. The vehicle 22 may include the seatbelt assembly 20, one or more seats 32, one or more pillars, a roof 34, a floor 36, etc.

The vehicle 22 may include a body and a frame. The body and frame may be of a unibody construction. In the unibody construction, the body, e.g., rockers, pillars, the roof 34, etc., serves as the vehicle 22 frame. As another example, the body and frame may have a body-on-frame construction (also referred to as a cab-on-frame construction). In other words, the body and frame are separate components, i.e., are modular, and the body is supported on and affixed to the frame. Alternatively, the body and frame may have any suitable construction. The body and/or the frame may be formed of any suitable material, for example, steel, aluminum, carbon fiber, etc.

Figure 7:
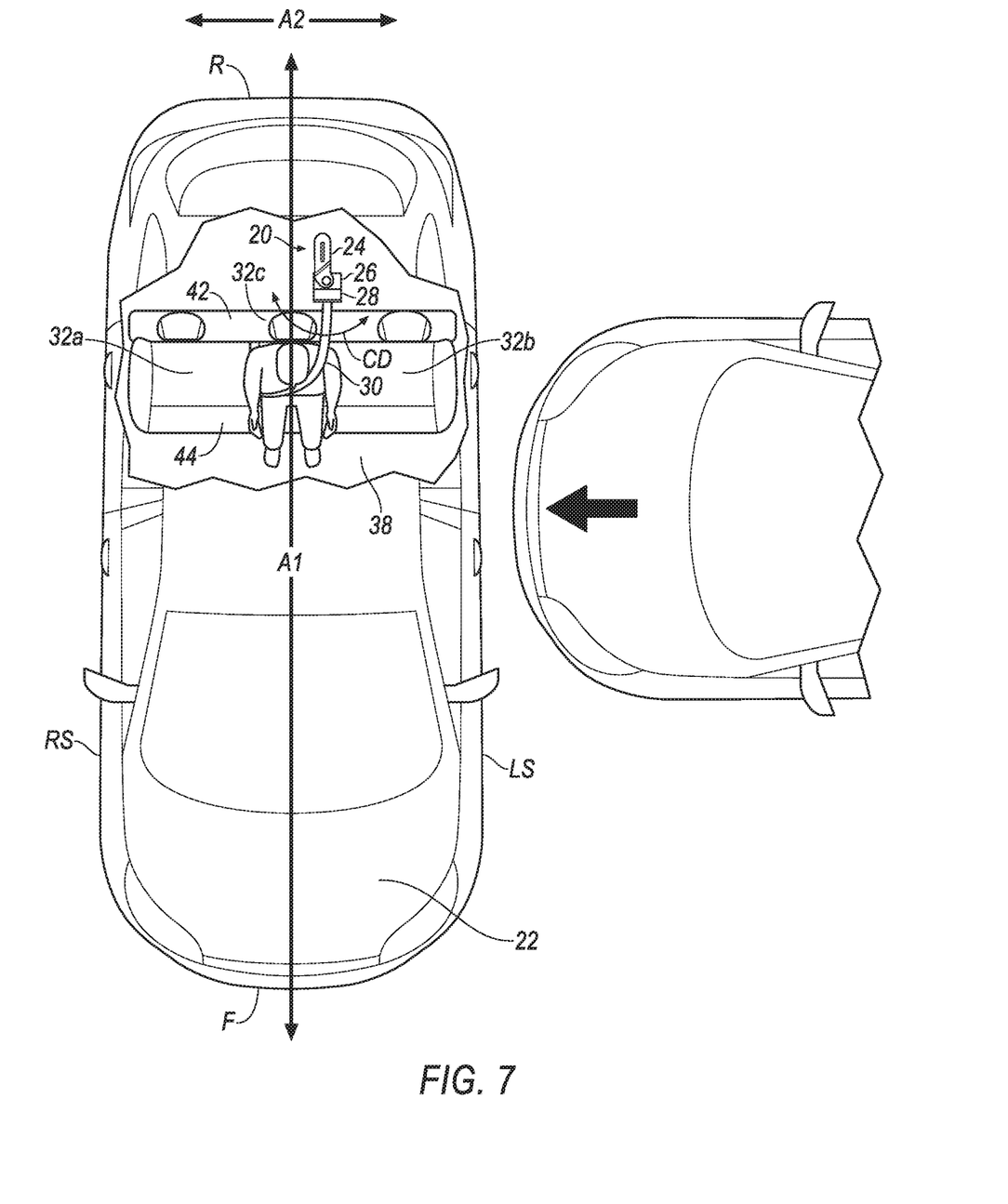
FIG. 7 is a top view of the example vehicle including the seatbelt assembly prior to vehicle impact.
Figure 8:
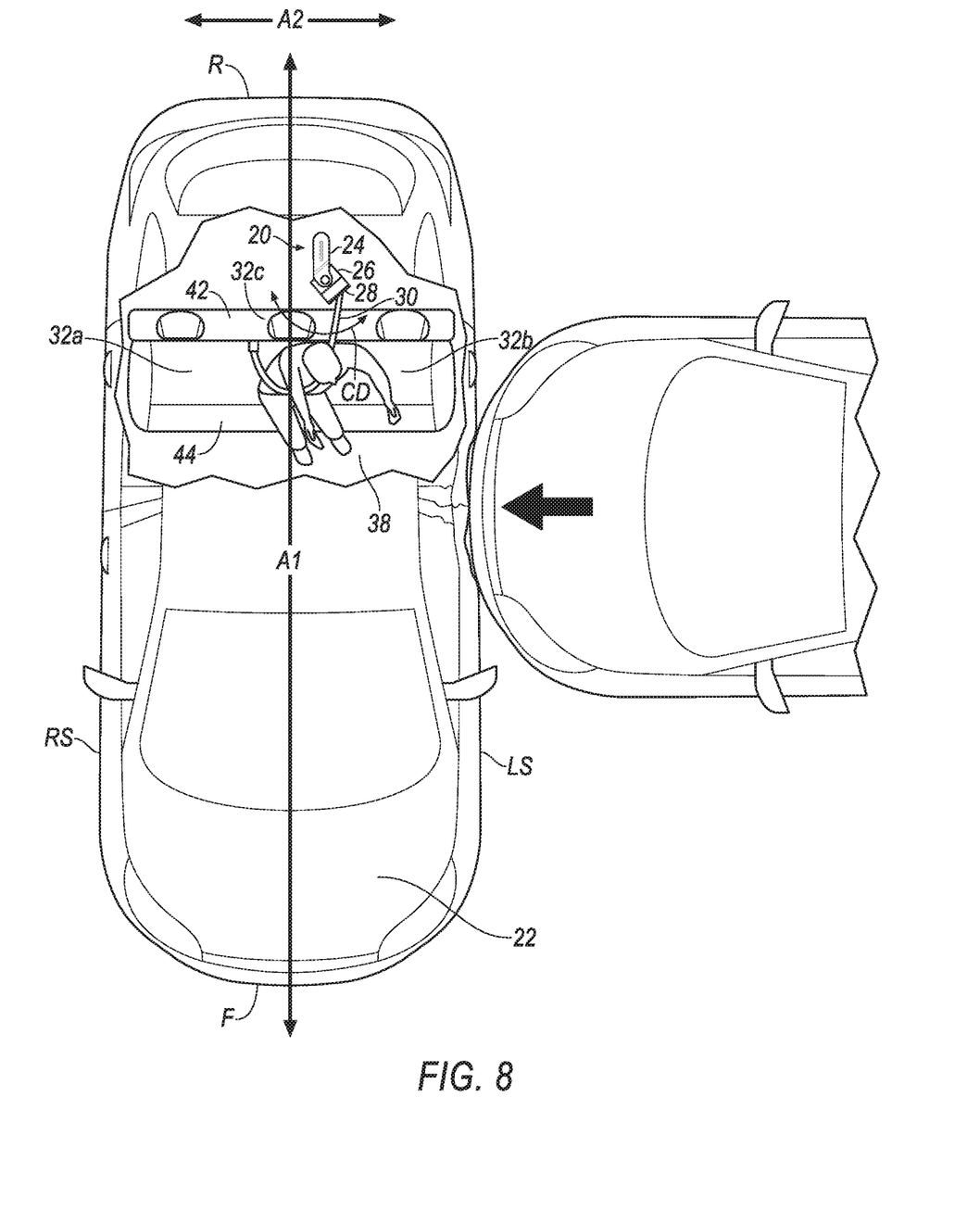
FIG. 8 is a top view of the example vehicle including the seatbelt assembly during a vehicle side impact.

The vehicle 22 may include a vehicle occupant compartment 38. The vehicle occupant compartment 38 houses vehicle 22 components designed for interaction with an occupant and/or operator of the vehicle 22, e.g., the seats 32, the seatbelt assembly 20, an instrument panel, etc. The vehicle occupant compartment 38 has a longitudinal axis A1, i.e., extending between a front "F" and a rear "R" of the vehicle 22. The vehicle occupant compartment 38 has a lateral axis A2, i.e., extending between a left side "LS" and a right side "RS" of the vehicle 22. The vehicle occupant compartment 38 has a vertical axis A3, i.e., extending between a top "T" and a bottom "B" of the vehicle 22. The longitudinal axis A1, the lateral axis A2, and the vertical axis A3 may all be perpendicular to each other. The directions front "F", rear "R", left side "LS", right side "RS", top "T", and bottom "B" are all relative to an orientation of the operator of the vehicle 22, an orientation of controls for operating the vehicle 22, e.g., the instrument panel, a driving direction when wheels of the vehicle 22 are all parallel with each other, etc. The longitudinal axis A1 may bisect the vehicle occupant compartment 38. For example, the longitudinal axis A1 may divide the vehicle occupant compartment 38 into generally equal halves, as shown in FIGS. 7 and 8. As another example, the longitudinal axis A1 may divide the vehicle occupant compartment 38 into unequal portions, e.g., a 60/40 split.

Figure 2:
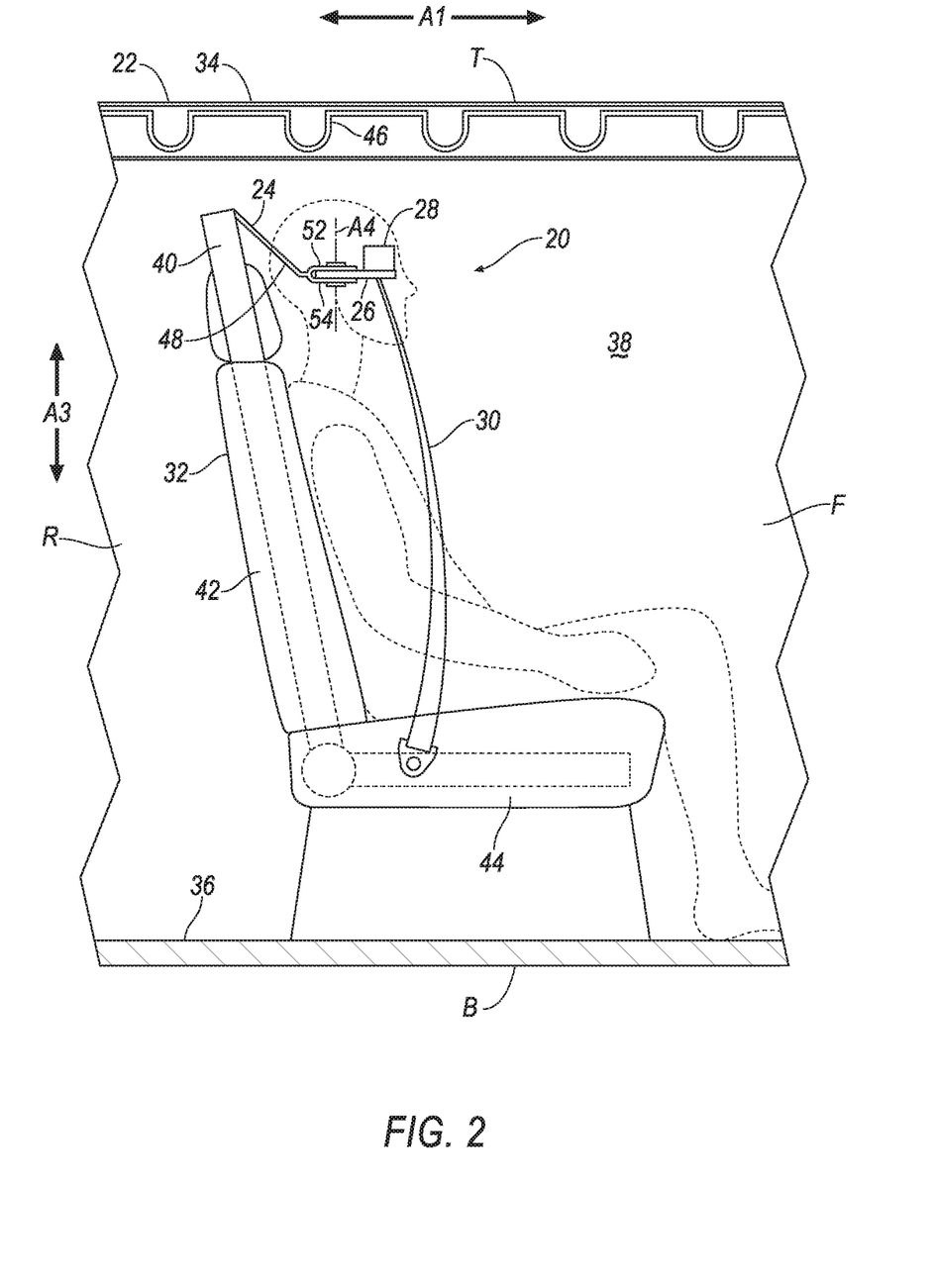
FIG. 2 is a side cross section of the example vehicle and one of the seatbelt assemblies secured to a seat of the vehicle.
Figure 3:
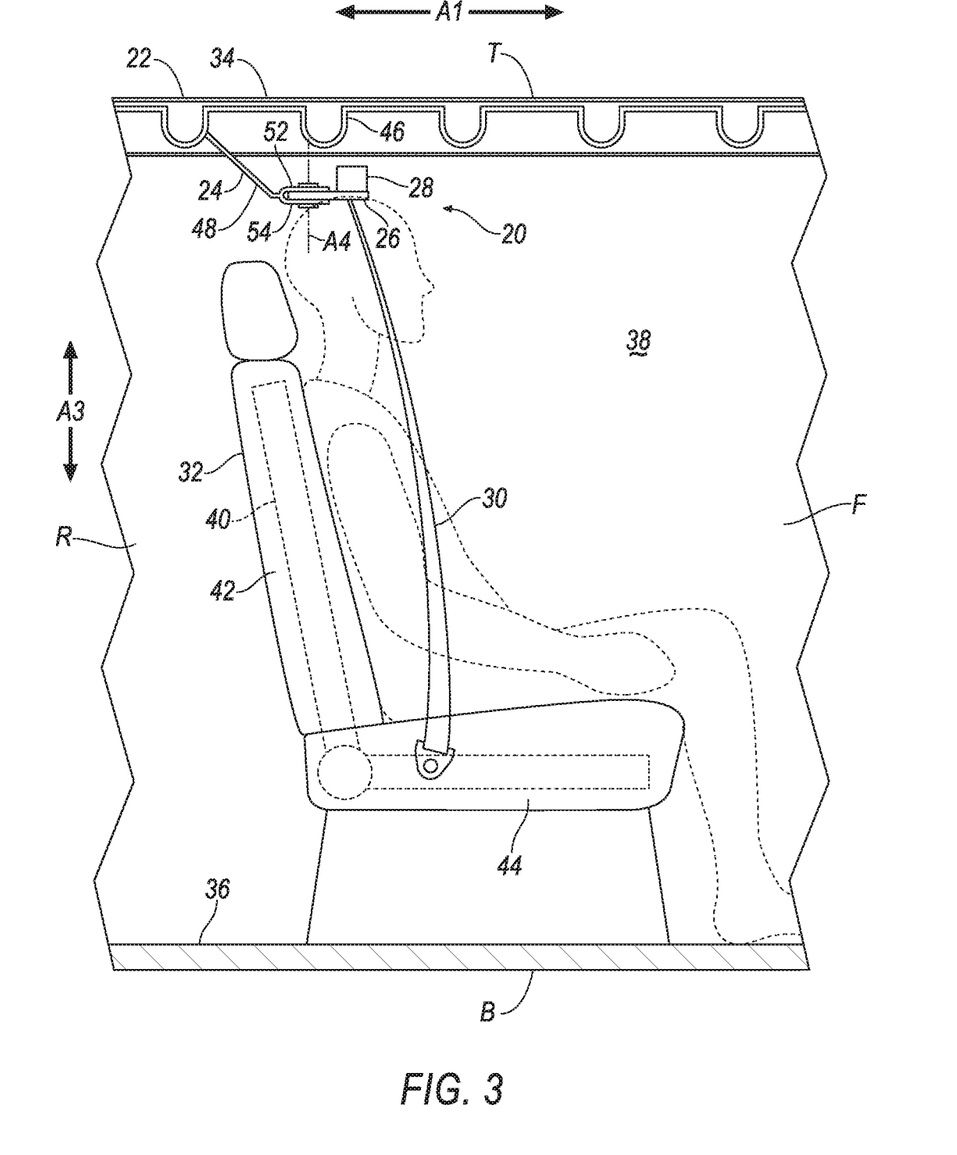
FIG. 3 is a side cross section of the example vehicle and one of the seatbelt assemblies secured to a roof of the vehicle.

The seat 32 may include a frame 40, as shown in FIGS. 2 and 3. The frame 40 may include tubes, beams, etc. For example, the frame 40 may be formed of any suitable plastic material, e.g., carbon fiber reinforced plastic (CFRP), glass fiber-reinforced semi-finished thermoplastic composite (organosheet), etc. As another example, some or all components of the frame 40 may be formed of a suitable metal, e.g., steel, aluminum, etc.

The seat 32 may include a seat back 42, a seat bottom 44, etc. The seat back 42 may be supported by the seat bottom 44 and may be stationary or movable relative to the seat bottom 44. The seat back 42 and the seat bottom 44 may be included in multiple seats 32. For example, a bench style seat 32 may include one seat back 42 (or more, e.g., a 60/40 split bench seat) and one seat bottom 44 that are included in three seats 32, e.g., first and second seats 32a, 32b with a third seat 32c located therebetween, as shown in FIGS. 7 and 8.

The seat 32 may be supported in the vehicle occupant compartment 38, e.g., by the floor 36. The seat 32 may be on the longitudinal axis A1, such as the third seat 32c shown in FIGS. 7 and 8. To put it another way, the seat 32 may be equidistant from the left side "LS" and the right side "RS" of the vehicle 22. Multiple seats 32 may be supported in the vehicle 22 occupant compartment 38. For example, the first seat 32a, the second seat 32b, and the third seat 32c may be supported in the vehicle occupant compartment 38. The second seat 32b may be spaced from the first seat 32a along the lateral axis A2. The third seat 32c may be between the first seat 32a and the second seat 32b.

The vehicle roof 34 provides cover for occupants for the vehicle 22. With reference to FIGS. 2 and 3, the vehicle roof 34 may include an inner panel 46, an outer panel, a headliner, a trim cover etc. The inner panel 46 provides support to the trim cover, the outer panel, the headliner, etc. The inner panel 46 may be made of steel, aluminum, carbon fiber, or any other suitable material. The outer panel and the headliner provide class-A surfaces to the roof 34, i.e., surfaces specifically manufactured to have a high-quality, finished aesthetic appearance free of blemishes, etc.

The base 24, shown in FIGS. 1-8, secures the first plate 26 and the seatbelt retractor 28 within the occupant compartment 38. The base 24 may include a main portion 48, shown in FIGS. 4-6. The main portion 48 may be rectangular. The main portion 48 may include a groove 50, e.g., to provide additional stiffness to the main portion 48. The base 24 may include a second plate 52. The base 24 may include a third plate 54. The third plate 54 may be spaced from the second plate 52, e.g., defining a gap 56 therebetween. The second plate 52 and the third plate 54 may be parallel. The second plate 52 and the third plate 54 may be transverse to the main portion 48. The base 24 includes a distal end 58. The distal end 58 may be at the second plate 52 and/or the third plate 54. The distal end 58 may have an arcuate profile. The arcuate profile enables the first plate 26 to pivot relative to the base 24 without binding the seatbelt retractor 28 against the distal end 58 of the base 24. The base 24 may be made of metal or any other suitable material.

Figure 4:
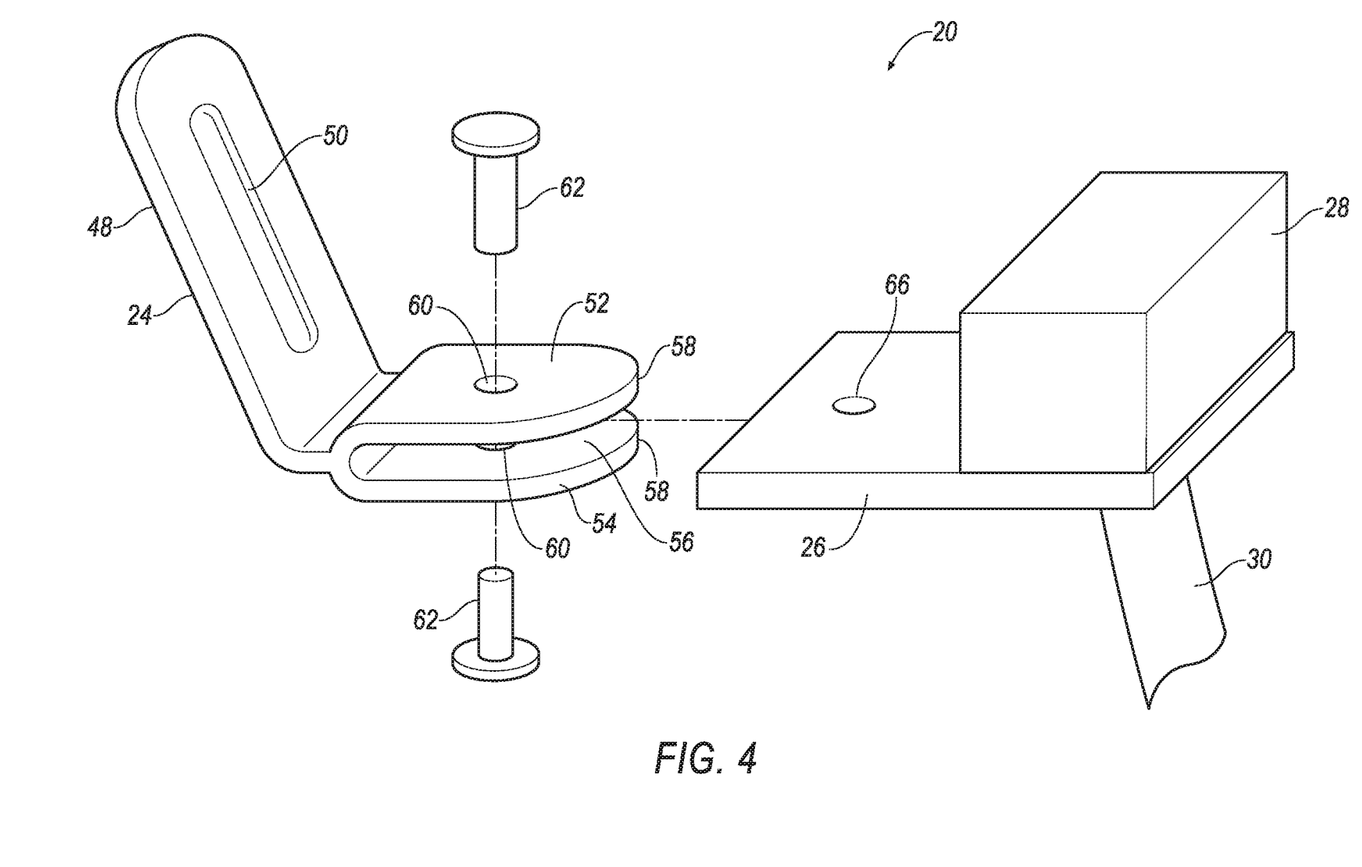
FIG. 4 is a perspective exploded view of the seatbelt assembly.
Figure 5:
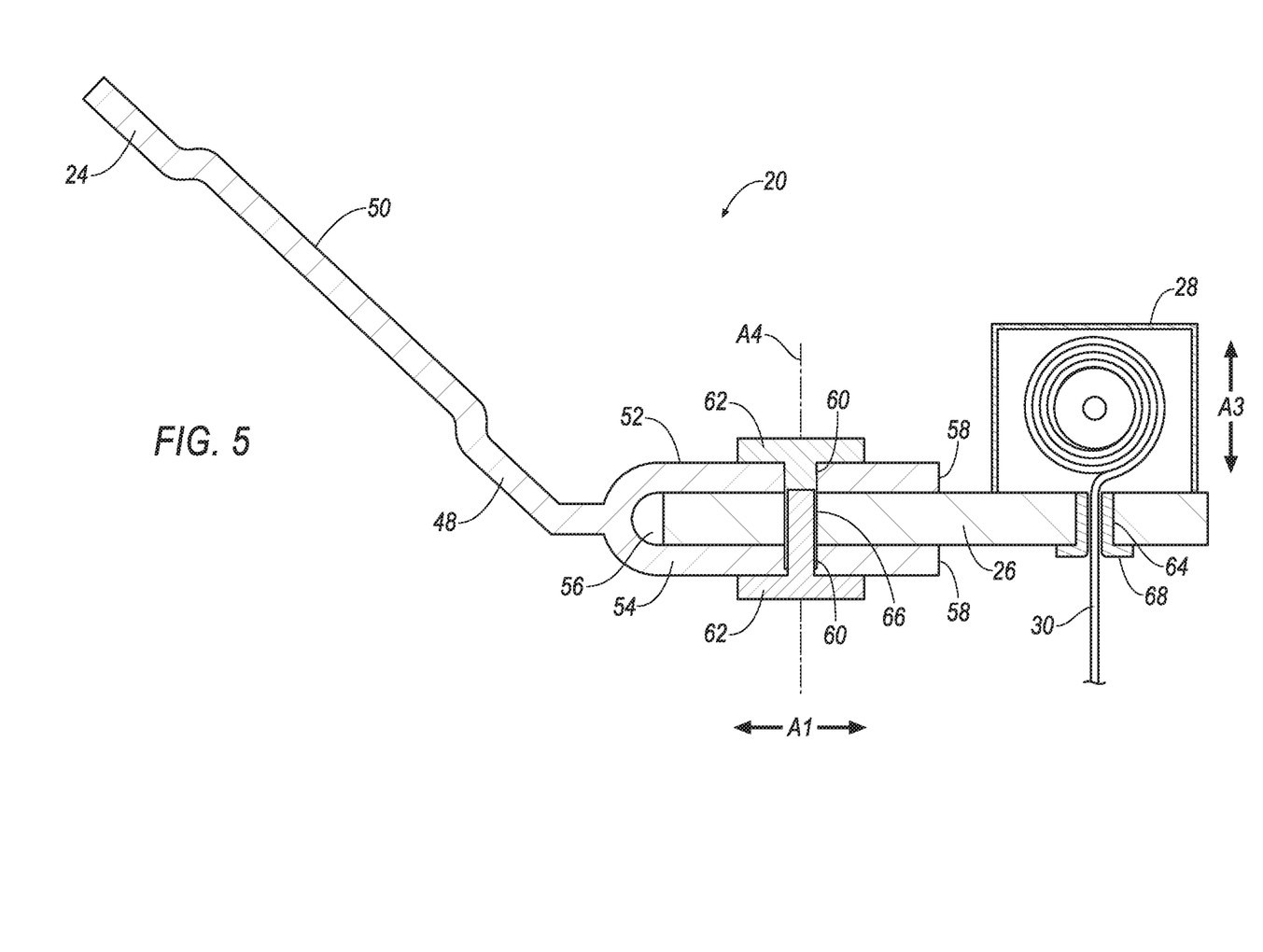
FIG. 5 is a side cross section of the seatbelt assembly.
Figure 6:
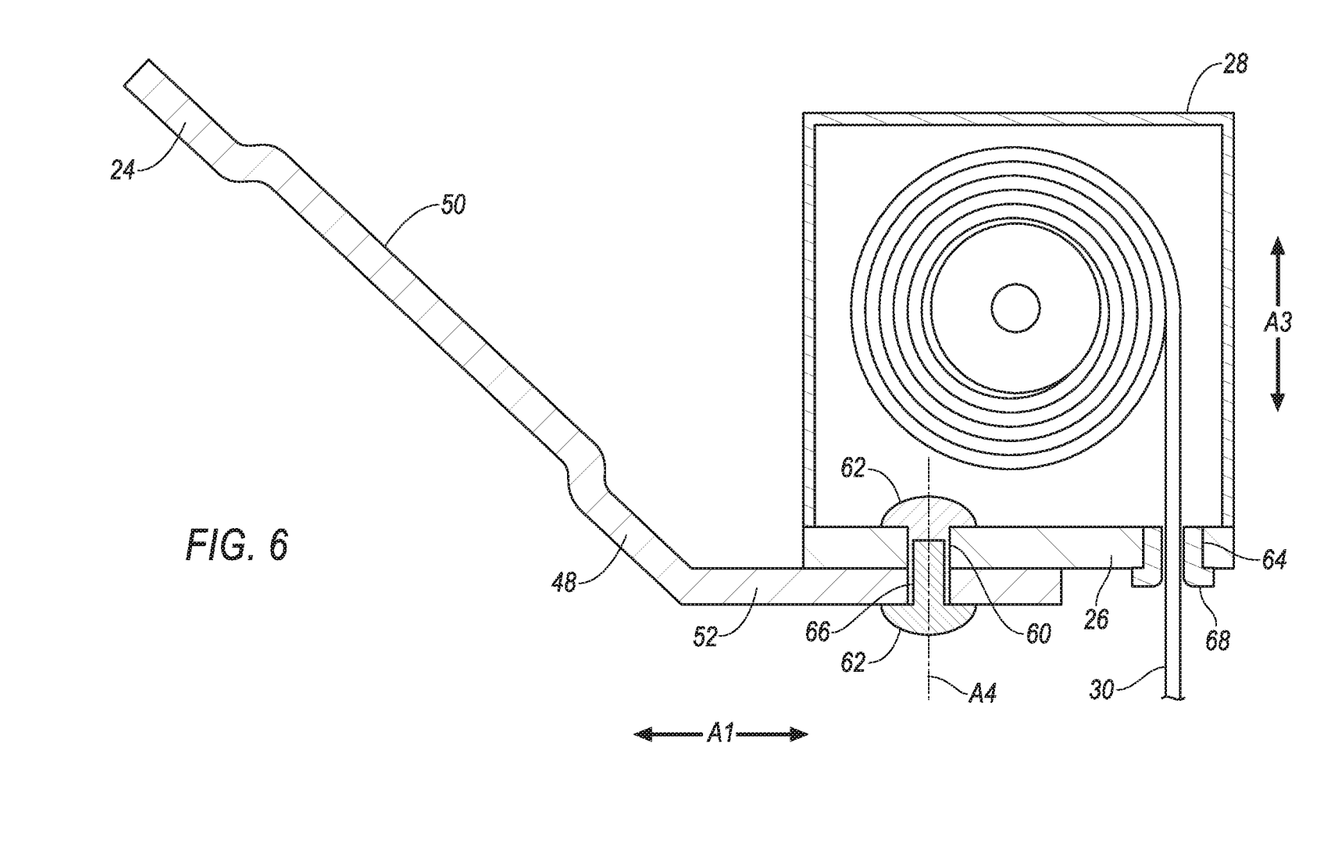
FIG. 6 is a side cross section of another embodiment of the seatbelt assembly.

The base 24 may define one or more holes 60, shown in FIGS. 4-6. For example, the second plate 52 and the third plate 54 may each define holes 60. The hole 60 of the second plate 52 may be aligned with the hole 60 of the third plate 54. To put it another way, the holes 60 in the second plate 52 and the third plate 54 may be positioned to jointly receive a hinge pin 62.

Figure 1:
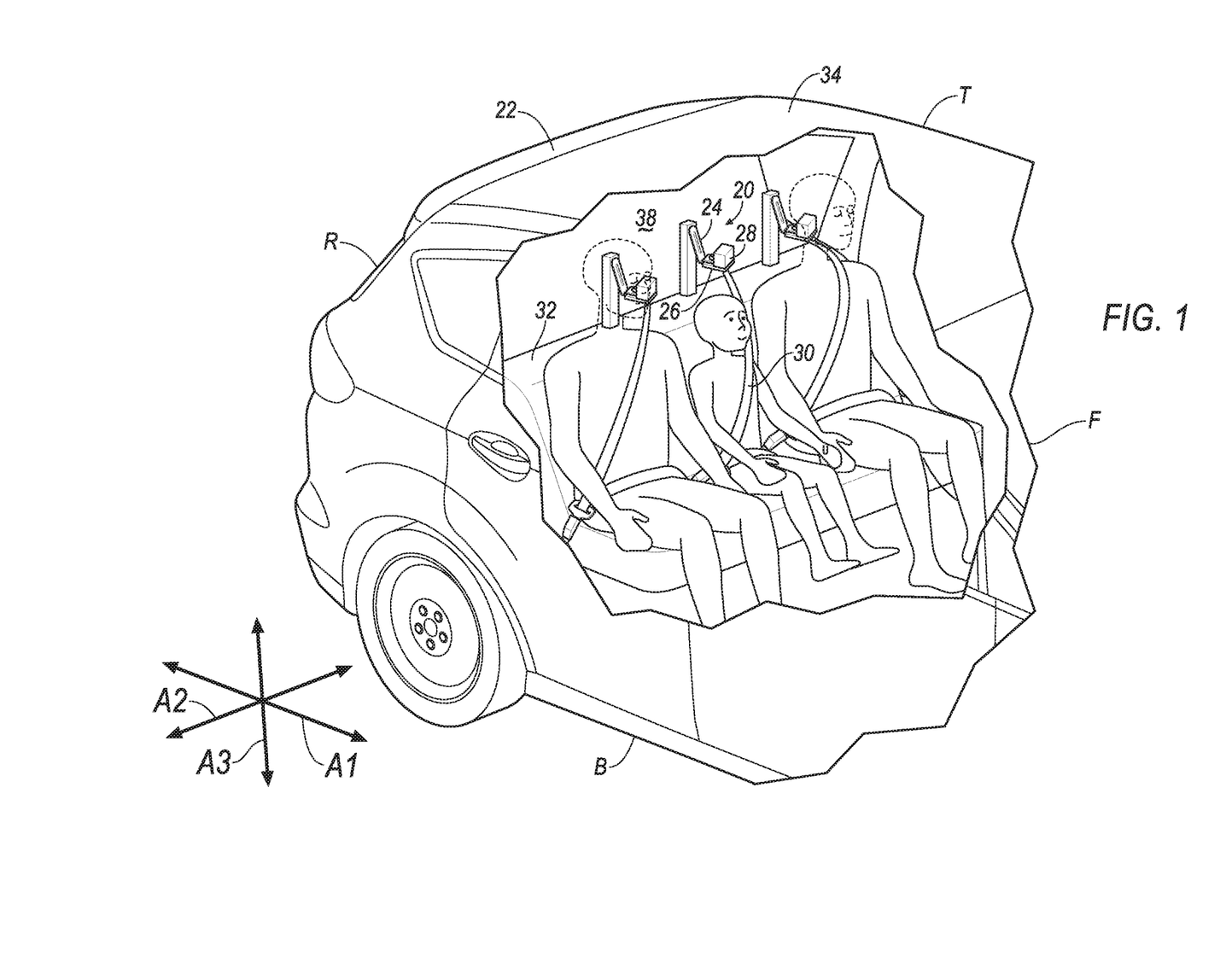
FIG. 1 is a perspective view of an example vehicle including multiple seatbelt assemblies.

The base 24 may be secured to the seat 32. For example, main portion 48 of the base 24 may be fixed to the frame 40 of the seat 32, e.g., via fasteners, welding, etc., as shown in FIGS. 1 and 2. The base 24 may be supported by the vehicle roof 34. For example, the main portion 48 of the base 24 may be fixed to the inner panel 46, e.g., via fasteners, welding, etc., as shown in FIG. 3.

The base 24 may be supported above the seat 32, e.g., such that the base 24 is above a shoulder of the occupant of the seat 32. To put it another way, the seat 32 may be underneath the base 24. The base 24 may be supported above a specific seat 32, e.g., the third seat 32c. To put it another way the third seat 32c may be underneath the base 24, as shown in FIGS. 6 and 7.

The first plate 26 supports the seatbelt retractor 28. The first plate 26 may include a slot 64, shown in FIGS. 5 and 6. The first plate 26 may include a hole 66. The first plate 26 may extend horizontally. For example, the first plate 26 may be planar and extend along the longitudinal axis A1 and the lateral axis A2. To put it another way, the first plate 26 may positioned such that the vertical axis A3 is normal to the first plate 26. The base 24 may be transverse to the first plate 26. The first plate 26 may be metal or any other suitable material.

The first plate 26 is pivotally supported by the base 24. For example, the first plate 26 may be disposed between the second plate 52 and the third plate 54. To put it another way. The first plate 26 may be located in the gap 56 between the second plate 52 and the third plate 54.

The first plate 26 may be connected to the base 24 with the hinge pin 62. The hinge pin 62 may be engaged with the first plate 26, the second plate 52 and the third plate 54. For example, the hinge pin 62 may be disposed within the hole 66 of the first plate 26, and the holes 60 of the second plate 52 and the third plate 54. The hinge pin 62 may be friction fit the in the hole 60 in the second plate 52 and/or the third plate 54, and may be slip fit in the hole 66 in the first plate 26, and vice versa. The hinge pin 62 may be cylindrical. The hinge pin 62 may include a pair of halves threadedly engaged with each other. The hinge pin 62 may be metal or any other suitable material.

The first plate 26 pivots about an axis A4. The axis A4 extends transverse to the roof 34. For example, the axis A4 may by generally vertical, i.e., within 5 degrees of vertical. To put it another way, the axis A4 may be generally parallel, i.e., within 5 degrees of parallel, with the vertical axis A3 defined by the vehicle occupant compartment 38. As another example, the axis A4 may be offset from the vertical axis A3, e.g., tilted 10 degrees, 20 degrees, etc. toward the front "F," and/or one of the sides "RS," "LS," of the vehicle 22 (not shown).

The first plate 26 pivots in a cross-vehicle direction CD, as shown in FIGS. 7 and 8. To put it another way, the first plate 26 pivots between orienting the seatbelt retractor 28 towards the right side "RS" of the vehicle 22 and towards the left "LS" of the vehicle 22.

The seatbelt assembly 20 may include a liner 68, as shown in FIGS. 5 and 6. The liner 68 may be supported by the first plate 26. The liner 68 reduces friction between the webbing 30 and the first plate 26. For example, the liner 68 may be supported at the slot 64. For example, the liner 68 may extend through, and surround, the slot 64. The liner 68 may be plastic or any other suitable material.

The seatbelt retractor 28 is supported by the first plate 26. For example, the seatbelt retractor 28 may be fixed to the first plate 26 with one or more fasteners, etc., or in any other suitable manner.

The seatbelt retractor 28 may include a spool. The spool may freely rotate within the retractor 28. The spool may be adapted to receive the webbing 30, for example, by including a webbing attachment slot and permitting the webbing 30 to wind around the spool. The seatbelt retractor 28 may include a locking mechanism that inhibits rotation of the spool when the vehicle 22 is subject to deceleration above a threshold amount, e.g., during the impact of the vehicle 22.

The seatbelt retractor 28 may be supported on top of the first plate 26, e.g., relative to the vertical axis A3, the top "T" of the vehicle 22, etc., as shown in FIGS. 1-3, 7 and 8. For example, the seatbelt retractor 28 may be between the first plate 26 and the roof 34. For example, the first plate 26 may be between the seat 32 and the seatbelt retractor 28.

The seatbelt retractor 28 may be spaced from the base 24, as shown in FIGS. 2, 3, 5, and 6. For example, the seatbelt retractor 28 may be spaced from the distal end 58 of the second plate 52 and/or the third plate 54. Spacing the seatbelt retractor 28 from the base 24 enables the first plate 26 to pivot relative to the base 24 without binding the seatbelt retractor 28 against the base 24.

The seatbelt reactor 28 may be above where the first plate 26 pivots relative to the base 24, as shown in FIG. 6. For example, the hinge pin 62 may be within a housing of the retractor 28. For example, the seatbelt reactor 28 may be above the holes 60, 66.

The webbing 30 may be formed of fabric in the shape of a strap. The webbing 30 may be attached to the spool, with the webbing 30 wound around the spool. The webbing 30 may be payable from the seatbelt retractor 28, e.g., when the spool is not prevented from rotating by the locking mechanism. The webbing 30 may disposed within the slot 64. For example, the webbing 30 may be slideably received in the slot 64.

In operation, the first plate 26 and the seatbelt retractor 28 may be generally centered, i.e., within 5 degrees of being centered, e.g., between pivoting toward the right side "RS" of the vehicle 22 and the left side "LS" of the vehicle 22, as shown in FIG. 7. Upon an impact to the vehicle 22, e.g., a side impact, an oblique impact, a front impact, etc., movement of the occupant restrained by the seatbelt assembly 20 may cause the occupant, or a portion of the occupant such as a torso, to move toward the left side "LS," the right side "RS," and/or the front "F" of the vehicle 22. Movement of the occupant may urge the webbing 30, and the first plate 26 and seatbelt retractor 28 may pivot relative to the base 24 and along with the webbing 30, e.g., as shown in FIG. 8. Pivoting of the first plate 26 and seatbelt retractor 28 helps the webbing 30 to remain centered within the slot 64, e.g., inhibiting bunching of the webbing 30 toward one end of the slot 64, thereby reducing localized loads and stress concentrations in the webbing 30, first plate 26, seatbelt retractor 28, etc.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. An assembly, comprising:
   a base;
   a plate pivotally supported by the base, the plate pivotable in a cross-vehicle direction;
   a seatbelt retractor supported by, and pivotal relative to the base along with, the plate; and
   a webbing payable from the seatbelt retractor.

2. The assembly of claim 1, further comprising a seat, the base secured to the seat.

3. The assembly of claim 1, further comprising a vehicle roof, the base supported by the vehicle roof.

4. The assembly of claim 1, further comprising a vehicle occupant compartment having a longitudinal axis bisecting the vehicle occupant compartment, and a seat on the longitudinal axis, wherein the seat is underneath the base.

5. The assembly of claim 1, further comprising a vehicle roof and an axis extending transverse to the vehicle roof, wherein the plate pivots about the axis.

6. The assembly of claim 5, wherein the axis is generally vertical.

7. The assembly of claim 1, further comprising a vehicle occupant compartment having a lateral axis, a first seat, a second seat spaced from the first seat along the lateral axis, and a third seat between the first seat and the second seat, wherein the third seat is underneath the base.

8. The assembly of claim 1, wherein the seatbelt retractor is supported on top of the plate.

9. The assembly of claim 1, wherein the plate extends horizontally.

10. The assembly of claim 1, wherein the plate includes a slot, the webbing disposed within the slot.

11. The assembly of claim 10, further comprising a liner supported by the plate at the slot.

12. The assembly of claim 1, further comprising a hinge pin connecting the base to the plate.

13. The assembly of claim 1, where the base includes a second plate and a third plate spaced from the second plate, the plate disposed between the second plate and the third plate.

14. The assembly of claim 13, further comprising a hinge pin engaged with the plate, the second plate and the third plate.

15. The assembly of claim 13, wherein the base includes a main portion, the second plate and the third plate are transverse to the main portion.

16. The assembly of claim 1, wherein the base includes a distal end having an arcuate profile.

17. The assembly of claim 1, wherein the seatbelt retractor is spaced from the base.

18. The assembly of claim 1, wherein the base is transverse to the plate.

19. An assembly, comprising:
    a vehicle roof;
    a base;
    a plate pivotally supported by the base, the plate pivotable about a generally vertical axis that extends transverse to the vehicle roof;
    a seatbelt retractor supported by the plate; and
    a webbing payable from the seatbelt retractor.

20. An assembly, comprising:
    a base;
    a plate pivotally supported by the base, the plate including a slot;
    a seatbelt retractor supported by the plate; and
    a webbing payable from the seatbelt retractor and disposed within the slot.

* * * * *